(12) United States Patent
Kapetanovic

(10) Patent No.: US 10,554,473 B2
(45) Date of Patent: Feb. 4, 2020

(54) PAM TRANSMISSION IN DL MU-MIMO BY CHOOSING SIGNALING DIMENSIONS

(71) Applicant: Telefonaktiebolaget LM Ericsson (publ), Stockholm (SE)

(72) Inventor: Dzevdan Kapetanovic, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/098,022

(22) PCT Filed: May 11, 2017

(86) PCT No.: PCT/EP2017/061332
§ 371 (c)(1),
(2) Date: Oct. 31, 2018

(87) PCT Pub. No.: WO2017/198540
PCT Pub. Date: Nov. 23, 2017

(65) Prior Publication Data
US 2019/0149391 A1    May 16, 2019

Related U.S. Application Data

(60) Provisional application No. 62/336,584, filed on May 14, 2016.

(51) Int. Cl.
*H04L 27/36* (2006.01)
*H04B 7/0452* (2017.01)
(Continued)

(52) U.S. Cl.
CPC ......... *H04L 27/366* (2013.01); *H04B 7/0452* (2013.01); *H04B 7/0456* (2013.01); *H04L 27/38* (2013.01)

(58) Field of Classification Search
CPC ..... H04L 27/366; H04L 27/38; H04B 7/0452; H04B 7/0456
See application file for complete search history.

(56) References Cited

U.S. PATENT DOCUMENTS

| | | | |
|---|---|---|---|
| 2010/0232528 A1* | 9/2010 | Li | H04B 7/0639 375/260 |
| 2011/0211520 A1* | 9/2011 | Gerstenberger | H04L 27/3405 370/312 |

(Continued)

FOREIGN PATENT DOCUMENTS

WO    2013179238 A1    12/2013

OTHER PUBLICATIONS

De Miguel R., "Real vs Complex BPSK precoding for MIMO broadcast channels", 2008 IEEE 19th International Symposium on Personal, Indoor and Mobile Radio Communications, Sep. 15, 2008, pp. 1-5, IEEE.

(Continued)

*Primary Examiner* — Freshteh N Aghdam
(74) *Attorney, Agent, or Firm* — Coats & Bennett, PLLC

(57) ABSTRACT

One dimension (real or imaginary) is selected for each of a first plurality of devices that receives one-dimensional modulated complex signals from an access point (AP). The AP uses the selected dimension to generate a modulated complex signal for transmission to each such device, where the signal received by such devices is substantially free of inter-user interference on the dimension selected for the corresponding device. The AP then transmits the complex signal to the devices. As a result, the AP puts the modulated symbols received by of the first plurality of devices are received on either a real part or an imaginary part, but not both, and thus reduces the energy consumption associated with the transmission. Each of the first plurality of wireless (Continued)

devices considers either the real part or the imaginary part of the received signals.

19 Claims, 7 Drawing Sheets

(51) Int. Cl.
*H04B 7/0456* (2017.01)
*H04L 27/38* (2006.01)

(56) References Cited

U.S. PATENT DOCUMENTS

2015/0173087 A1* 6/2015 Lampinen ......... H04L 25/03891
370/329
2015/0312081 A1* 10/2015 Yang ........................ H04B 1/38
375/298

OTHER PUBLICATIONS

Anonymous, "ZF precoding with more users than transmit antennas for one-dimensional transmission and odd number", Research Disclosure, Questel Ireland Ltd, Feb. 22, 2016, pp. 1-5.
Kapetanovic, D. et al., "Some Notes on Interference Alignment for Downlink Multi-User MIMO", May 15, 2016, pp. 1-12, Ericsson Submission, IEEE 8/02.11-16/665r0.

* cited by examiner

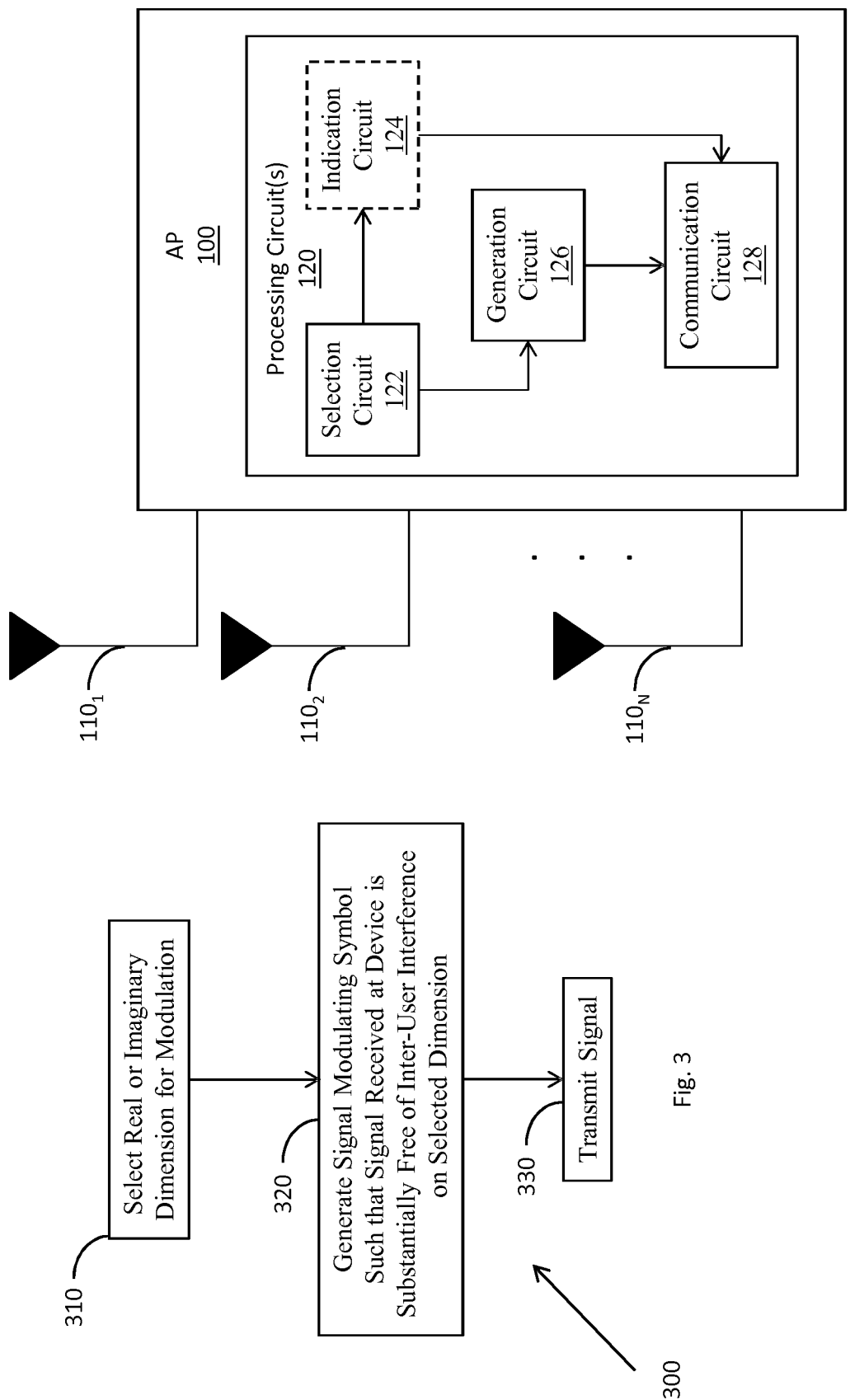

PAM TRANSMISSION IN DL MU-MIMO BY CHOOSING SIGNALING DIMENSIONS

FIELD OF INVENTION

The solution presented herein generally relates to improving the performance associated with the transmission of data streams, and more particularly to improving the performance associated with the transmission of modulated data streams, e.g., Pulse Amplitude Modulated (PAM) data streams.

BACKGROUND

As wireless devices become more prevalent for more than just personal communications, the importance of providing an efficient way for all of these devices to communicate increases. This is especially true for machine-to-machine (M2M) communications or machine-type communications (MTC) that are part of the Internet of Things (IoT), which provides a system of interrelated computing devices, mechanical and digital machines, objects, etc., that are provided with unique identifiers and the ability to transfer data over a network without requiring human-to-human or human-to-computer interaction. The machines involved in such communications may vary in size, and are typically used for a wide variety of applications, e.g., sensing environmental conditions (e.g., temperature reading), taking meter measurements (e.g., electricity usage), finding faults and/or errors (e.g., bridge fault detection), etc. In many applications, the machines involved in this type of communication are active infrequently but over a consecutive duration, e.g., approximately 200 ms every 2 seconds, approximately 500 ms every 60 minutes, etc. As such, these machines typically have low/intermittent power consumption, and many therefore be powered by a single AA battery for years, e.g., up to 10 years. Because most of these devices typically require low power operations, and because some of these devices may be located far from a network access point (AP), these devices often require a long range low power (LRLP) solution for receiving data transmitted from a single AP. Thus, the ability to efficiently transmit multiple data streams from a single AP to multiple devices becomes increasingly important.

SUMMARY

The solution presented herein selects a dimension (real or imaginary) for each of a plurality of devices that receives one-dimensional modulated complex signals from an access point, where the access point uses the selected dimensions to construct a precoder used to generate the data streams for transmission to each such device, where the constructed precoder has less energy than a pseudo inverse of the full channel matrix. More particularly, an access point (AP) according to the solution presented herein selects which one of the real or imaginary dimension a modulated symbol should be received at the device, where the selection is based on an expected energy consumption associated with the precoder constructed based on the selection, and where the AP uses the constructed precoder to generate the data streams for transmission. As a result, the AP constructs the transmission signal such that the received symbols are on either a real part or an imaginary dimension, and thus reduces the energy consumption associated with the precoder. Each receiving device therefore only considers either the real part or the imaginary part of the received signals, as specified to the receiving device by the AP. For example, the AP may signal the receiving device with the selected dimension, so the receiving device knows which dimension of the received signal to consider.

One embodiment comprises a method of transmitting modulated complex signals from an Access Point (AP) having a plurality of antennas to a plurality of wireless devices, where the plurality of wireless devices includes at least a first plurality of wireless devices configured to receive only one dimension of a modulated complex signal. The method comprises selecting, independently for each of the first plurality of wireless devices, which one of a real dimension and an imaginary dimension of a modulated symbol should be received on at the corresponding wireless device, generating a signal modulating the symbols for at least the first plurality of wireless devices such that the signal received at each wireless device in the first plurality of wireless devices is substantially free of inter-user interference, and transmitting the generated signal at least to the first plurality of wireless devices. One exemplary embodiment further comprises indicating to the wireless device the selected dimension. In one exemplary embodiment, the signal generation comprises generating a precoder for each combination of channel models for each combination of channels between the AP and each of the plurality of wireless devices, and selecting the precoder having the lowest energy. In one exemplary embodiment, the signal generation comprises generating a precoder for each combination of channel models for each combination of channels between the AP and each of the plurality of wireless devices, selecting a subset of the precoders corresponding to all combinations, and selecting, from the subset of precoders, a precoder having the lowest energy. In some embodiments, the subset selection may occur at random. In any event, selected precoder is then used to generate the signal for transmission. In one exemplary embodiment, the precoder generation comprises generating a complex channel model from each antenna at the AP to each antenna of each wireless device in the plurality of wireless devices, grouping the complex channel models from all AP antennas to all wireless devices in the plurality of wireless devices, expressing the channel models as real- and imaginary-valued representations, selecting and generating a precoder for all permutations of real- and imaginary-valued representations of the complex channel models subject to the constraint that each of the wireless devices in the first plurality of wireless devices receives a symbol on a real or imaginary dimension, but not both, and generating the precoder for each permutation.

Another embodiment comprises an Access Point (AP) operative to transmit modulated complex signals to a plurality of wireless devices, the plurality of wireless devices including at least a first plurality of wireless devices configured to receive only one dimension of a modulated complex signal. The AP comprises a plurality of antennas and one or more processing circuits operatively controlling the antennas. The one or more processing circuits are operative to select, independently for each of the first plurality of wireless devices, which one of a real dimension and an imaginary dimension a modulated symbol should be received on at the corresponding wireless device, generate a signal modulating the symbols for at least the first plurality of wireless devices such that the signal received at each wireless device in the first plurality of wireless devices is substantially free of inter-user interference, and transmit the generated signal to at least the first plurality of wireless devices. In one exemplary embodiment, the one or more processing circuits are further operative to indicate to the selected dimension to at least one of the first plurality of wireless devices. In one exemplary embodiment, the one or more processing circuits generate the signal by generating a precoder for each combination of channel models for each combination of channels between the AP and each of the plurality of wireless devices, and selecting the precoder having the lowest energy. In one exemplary embodiment, the one or more processing circuits generate the signal by generating a precoder for each combination of channel models for each combination of channels between the AP and each of the plurality of wireless devices, selecting a subset of the precoders corresponding to all combinations, and selecting, from the subset of precoders, a precoder having the lowest energy. In some embodiments, the subset selection may occur at random. In any event, selected precoder is then used to generate the signal for transmission. In one exemplary embodiment, the one or more processing circuits generate the precoder by generating a complex channel model from each antenna at the AP to each antenna of each wireless device in the plurality of wireless devices, grouping the channel models from all AP antennas to all wireless devices in the plurality of wireless devices, expressing the channel models as real- and imaginary-valued representations, selecting and generating a precoder for all permutations of real- and imaginary-valued representations of the complex channel models subject to the constraint that each of the wireless devices in the first plurality of wireless devices receives a symbol on a real or imaginary dimension, but not both, and generating the precoder for each permutation.

Another embodiment comprises a method of receiving, at a wireless device configured to receive a modulated complex signal from an Access Point (AP) having a plurality of antennas and transmitting to a plurality of wireless devices. The method comprises identifying either a real dimension or an imaginary dimension as comprising data for the wireless device, and receiving a signal in which a symbol is modulated onto the identified one of the real or imaginary dimension, but not both, such that the symbol modulated onto the identified dimension is free of inter-user interference. In one exemplary embodiment, identifying the real or imaginary dimension comprises receiving, from the AP, an indication of either the real or imaginary dimension.

Another embodiment comprises a wireless device operative to receive a modulated complex signal from an Access Point (AP) transmitting to a plurality of wireless devices. The wireless device comprises one or more antennas and one or more processing circuits operatively controlling the antennas. The one or more processing circuits are operative to identify either a real dimension or an imaginary dimension as comprising data for the wireless device and receive a signal in which a symbol is modulated onto the identified one of the real or imaginary dimension, but not both, such that the symbol modulated onto the identified dimension is free of inter-user interference. In one exemplary embodiment, the one or more processing circuits identify the dimension by receiving, from the AP, an indication of either the real or imaginary dimension.

Another embodiment comprises an Access Point (AP) operative to transmit modulated complex signals to a plurality of wireless devices, the plurality of wireless devices including at least a first plurality of wireless devices configured to receive only one dimension of a modulated complex signal. The AP comprises a plurality of antennas and one or more processing modules operatively controlling the antennas. The one or more processing modules are operative to select, independently for each of the first plurality of wireless devices, which one of a real dimension and an imaginary dimension a modulated symbol should be received on at the corresponding wireless device, generate a signal modulating the symbols for at least the first plurality of wireless devices such that the signal received at each wireless device in the first plurality of wireless devices is substantially free of inter-user interference, and transmit the generated signal to at least the first plurality of wireless devices. One exemplary embodiment further comprises indicating the selected dimension to the wireless device. In one exemplary embodiment, the one or more processing modules generate the signal by generating a precoder for each combination of channel models for each combination of channels between the AP and each of the plurality of wireless devices, and selecting the precoder having the lowest energy. In one exemplary embodiment, the one or more processing modules generate the signal by generating a precoder for each combination of channel models for each combination of channels between the AP and each of the plurality of wireless devices, selecting a subset of the precoders corresponding to all combinations, and selecting, from the subset of precoders, a precoder having the lowest energy. In some embodiments, the subset selection may occur at random. In any event, selected precoder is then used to generate the signal for transmission. In one exemplary embodiment, the one or more processing modules generate the precoder by generating a complex channel model from each antenna at the AP to each antenna of each wireless device in the plurality of wireless devices, grouping the channel models from all AP antennas to all wireless devices in the plurality of wireless devices, expressing the channel models as real- and imaginary-valued representations, selecting and generating a precoder for all permutations of real- and imaginary-valued representations of the complex channel models subject to the constraint that each of the wireless devices in the first plurality of wireless devices receives a symbol on a real or imaginary dimension, but not both, and generating the precoder for each permutation.

Another embodiment comprises a wireless device operative to receive a modulated complex signal from an Access Point (AP) transmitting to a plurality of wireless devices. The wireless device comprises one or more antennas and one or more processing modules operatively controlling the antennas. The one or more processing modules are operative to identify either a real dimension or an imaginary dimension as comprising data for the wireless device and receive a signal in which a symbol is modulated onto the identified one of the real or imaginary dimension, but not both, such that the symbol modulated onto the identified dimension is free of inter-user interference. In one exemplary embodiment, the one or more processing modules identify the dimension by receiving, from the AP, an indication of either a real or imaginary dimension.

Another exemplary embodiment comprises a computer program product stored in a non-transitory computer readable medium for controlling one or more processing circuits in an Access Point (AP) having a plurality of antennas in communication with a plurality of wireless devices, the plurality of wireless devices including at least a first plurality of wireless devices configured to receive only one dimension of a modulated complex signal. The computer program product comprises software instructions which, when run on the one or more processing circuits, causes the one or more processing circuits to select, independently for each of the first plurality of wireless devices, which one of a real dimension and an imaginary dimension a modulated symbol should be received on at the corresponding wireless device, generate a signal modulating the symbols for at least the first plurality of wireless devices such that the signal received at each wireless device in the first plurality of wireless devices is substantially free of inter-user interference, and transmit the generated signal to at least the first plurality of wireless devices.

Another exemplary embodiment comprises a computer program product stored in a non-transitory computer readable medium for controlling one or more processing circuits in a wireless device configured to receive a modulated complex signal form an Access Point (AP) having a plurality of antennas. The computer program product comprises software instructions which, when run on the one or more processing circuits, causes the one or more processing circuits to identify either a real dimension or an imaginary dimension as comprising data for the wireless device and receive a signal in which a symbol is modulated onto the identified one of the real or imaginary dimension, but not both, such that the symbol modulated onto the identified dimension is free of inter-user interference.

BRIEF DESCRIPTION OF THE DRAWINGS

FIG. 3 shows an exemplary method implemented by the AP for each wireless device.
FIG. 4 shows a block diagram of an exemplary AP.

DETAILED DESCRIPTION

For simplicity and illustrative purposes, the solution presented herein is described by referring mainly to an exemplary embodiment thereof. In the following description, numerous specific details are set forth in order to provide a thorough understanding of the solution. However, it will be readily apparent to one of ordinary skill in the art that the solution presented herein may be practiced without limitation to these specific details. In this description, well known methods and structures have not been described in detail so as not to unnecessarily obscure the solution presented herein.

It will be appreciated that the solution presented herein may be used for any wireless apparatus that sends signals to the AP via uplink communications and that receives signals from the AP via downlink communications. Exemplary wireless apparatus/devices include, but are not limited to, MTC apparatus, Device-to-Device (D2D) apparatus, Machine-to-Machine (M2M) apparatus, User Equipment (UE), eMTC apparatus, mobile telephones, sensors, tablets, personal computers, set-top boxes, cameras, etc. Further, the AP may comprise any wireless access node that transmits signals to the wireless apparatus via downlink communications and receives signals from the wireless apparatus via uplink communications. Exemplary APs include, but are not limited to, a base station, NodeB, eNodeB, etc.

Figure 1:
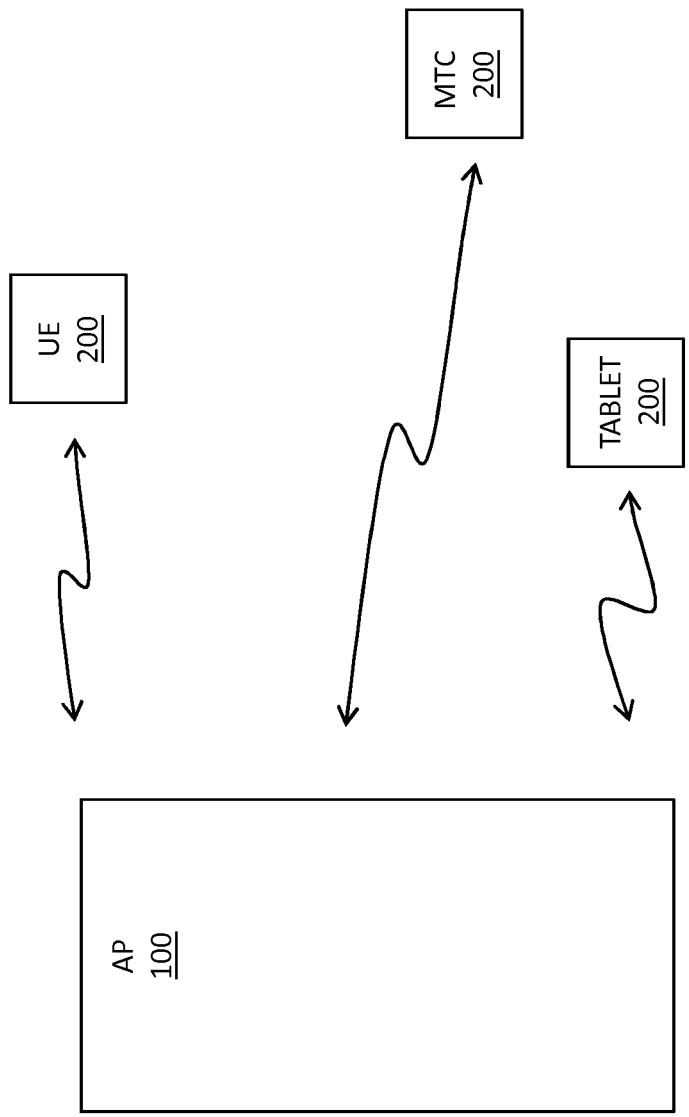
FIG. 1 shows an exemplary wireless network.

FIG. 1 shows an exemplary wireless network comprising an AP 100 in wireless communication with a plurality of wireless devices 200, e.g., a UE, MTC, and tablet. AP 100 transmits a data stream to each device 200. For simplicity, the following discussions assume each of the K wireless devices 200 has a single antenna and that the AP 100 has N antennas, where N is greater than or equal to K. It will be appreciated, however, that the solution presented herein may also be applied to devices 200 that have multiple receive antennas. Each wireless device 200 is configured to receive only one dimension of a modulated complex signal, e.g., a Pulse Amplitude Modulated (PAM) complex signal, or is configured to receive a modulated symbol on both dimensions of a complex signal, e.g., a Quadrature Amplitude Modulated (QAM) complex signal. The following first discusses the solution in terms of wireless devices configured to receive only one dimension.

AP 100 transmits data streams from the N antennas to the wireless devices 200, where a subset of the data streams are taken from a real-valued constellation, e.g., PAM signals. It will be appreciated that after the downlink multiple user, multiple-input-multiple-output (MU-MIMO) training, as performed by IEEE 802.11ac, the AP 100 has access to all of the channels from the AP 100 to the wireless devices 200. However, according to the solution presented herein, the AP 100 has the freedom to put some symbols, e.g., the real-valued symbols, on one of the real and imaginary parts of the transmitted signal (equivalently, either the cosine or the sine wave), and put other symbols on the other of the real and imaginary parts of the transmitted signal. This extra freedom facilitates the construction of new zero force (ZF) precoders having lower energy than the conventional ZF precoder, which simply inverts the entire complex-valued channel matrix representing the channels from the AP 100 to all of the wireless devices 200, as is typically done according to IEEE 802.11ac.

The data streams y received by the devices 200 from the AP 100 may be represented by:

$$y = HFa + n, \qquad (1)$$

where the $j^{th}$ entry ($y_j$) of y represents the sample received by and for the $j^{th}$ device 200, $H = [h_1; h_2; \ldots ; h_j]$ and represents the composite channel matrix that contains all the models of the channels (row j is the $j^{th}$ channel ($h_j$), where $h_j$ represents a 1×N complex-valued vector) from the AP 100 to the $j^{th}$ device 200, F represents a precoder, e.g., a Zero Force (ZF) precoder, the $j^{th}$ entry of a ($a_j$) represents the modulated symbol intended for the $j^{th}$ device, and n represents noise, e.g., Additive White Gaussian Noise (AWGN). In conventional systems, the ZF precoder may be determined according to $F = H^+$, where $H^+$ represents the pseudo-inverse of H. The ZF precoder therefore cancels inter-user interference, and thus when this precoder is applied as shown in Equation (1), the result is:

$$y = a + n. \qquad (2)$$

Hence, each device 200 receives the intended symbol perturbed with AWGN, and thus free from inter-user interference. While this conventional solution removes inter-user interference from the symbols intended for device 200, the resulting precoder consumes a lot of energy.

The solution presented herein seeks to simplify the conventional ZF precoder for signaling that relies on various modulation schemes. Exemplary embodiments apply to one-dimensional modulation schemes, e.g., PAM schemes such as Binary Phase Shift Keying (BPSK), but are not limited to such. To that end, the solution presented herein provides a scenario where either the real part of the symbols or the imaginary part of the symbols, but not both, received by a device 200 on some of its receive antennas is guaranteed to be free of inter-user interference, where the AP 100 selects either the real part or the imaginary part for each device 200 so as to reduce the energy associated with the precoder used to generate the transmitted signal. In this case, each vector and matrix in Equation (1) may be expanded to a real or complex valued representation. For example, the real-valued representation of a vector and a matrix may be given by:

$$v = \begin{bmatrix} v_r \\ v_i \end{bmatrix} \rightarrow v_r = \begin{bmatrix} \text{Re}\{v\} \\ \text{Im}\{v\} \end{bmatrix} \quad (3)$$

$$A = \begin{bmatrix} A_r \\ A_i \end{bmatrix} \rightarrow A_r = \begin{bmatrix} \text{Re}\{A\} & -\text{Im}\{A\} \\ \text{Im}\{A\} & \text{Re}\{A\} \end{bmatrix}$$

Thus, the real-valued model for Equation (1) may be given by:

$$y_r = H_r F_r a_r + n_r. \quad (4)$$

The structure of $F_r$ may be relaxed, e.g., $F_r$ may be an arbitrary $2N \times 2K$ real-valued matrix, and hence the skew-Hermitian structure that results from the real-valued representation may be relaxed for $F_r$. For simplicity, assume that all data streams are real-valued, which produces a modulated symbol $a_r$ that may be represented by:

$$a_r = \begin{bmatrix} \text{Re}\{a\} \\ 0 \end{bmatrix}, \quad (5)$$

Equation (4) may thus be simplified to:

$$y_r = H_r F_r \begin{bmatrix} \text{Re}\{a\} \\ 0 \end{bmatrix} + n_r. \quad (6)$$

From Equation (6), it follows that the guarantee of no inter-user interference maybe achieved if $F_r$ is obtained by only inverting the first K rows of $H_r$, instead of inverting the entire ZF precoder, as done for conventional systems. This will result in a precoder with less energy than $H^+$, which subsequently produces a power gain. Thus, for Equation (6), $F_r$ may be given by:

$$F_r = H_r(1:K,:)^+. \quad (7)$$

In other words, $F_r$ represents the real-valued pseudo inverse of the first K rows of $H_r$. As a net effect, each wireless device 200 will receive no inter-user interference on the real-part of the corresponding received signal. Thus, when decoding the PAM symbols, each wireless device 200 only considers the real-valued part of the received signals.

As an alternative or in addition, instead of inverting the first K rows of $H_r$, which guarantees that each real-part of the received signal is free from inter-user interference, the solution presented herein also considers the possibility of inverting the last K rows of $H_r$, which would guarantee that each imaginary-part of the received signal is free from inter-user interference. In this case, the imaginary-valued model for Equation (1) may be given by:

$$y_i = H_i F_i a_i + n_i. \quad (8)$$

Hence, for each device 200, it is also possible to guarantee that each device 200 will receive no inter-user interference on the imaginary part of the corresponding received signal. In this case, when decoding the received symbols, each device 200 only considers the imaginary part of the received samples.

Given the possibility of guaranteeing that either the real-part or the imaginary-part of the received signal is free from inter-user interference, the AP 100 has the option of selecting either the real-part or the imaginary part for each device 200. In other words, for each device 200, the AP 100 has the choice of either guaranteeing that its real-valued part is interference free, or that its imaginary part is interference free at the receiving device 200. In this way, the AP 100 picks out K rows out of a total of 2K rows, with the constraint that if the AP 100 chooses row j for a particular device 200, then the AP 100 cannot choose row j+K for that same device 200. Put differently, a device 200 may either receive the real part of the received signal interference free or the imaginary part of the received signal interference free, but not both at the same time. Hence, there are in total $2^K$ choices of rows, resulting in $2^K$ different possible precoders that the AP 100 may construct. The AP 100 selects the precoder with the lowest energy (or at least with a lower energy than $H^+$), and uses the selected precoder $F_r^{sel}$ to generate the complex valued vector to be transmitted. For example, let the real-valued symbol vector obtained when using the precoder with the lowest energy be represented by:

$$x_r = F_r^{sel} a_r. \quad (9)$$

The final complex-valued vector transmitted by the AP 100 may then be represented by:

$$x = x_r(1:N) + ix_r(N+1:2N). \quad (10)$$

Thus, the solution presented herein improves upon conventional ZF precoder constructions.

Once the AP 100 has selected the precoder, the AP 100 may signal information to each device 200 that identifies the dimension, e.g., real or imaginary, that each device 200 will receive its modulated symbol, e.g., the PAM modulated symbol. In one embodiment, this may comprise only one bit of information, and thus may be accomplished with little overhead. Alternatively, the need for any explicit signaling may be avoided. In this case, the wireless device 200 may determine the dimension by analyzing the received signal, e.g., by identifying the dimension having more energy.

The above discussion assumed that all data streams are real-valued. This assumption may be relaxed by allowing some symbols to be complex-valued, e.g., some devices receive complex-valued symbols while other devices receive real-valued symbols. In this case, we also may represent the modulated symbol $a_r$ as shown in Equation (5), but where there are fewer zeros in the "complex" portion of the matrix because not all devices receive real-valued symbols. In this case, the solution presented herein may still be applied, but only to those devices that receive the real-valued symbols, e.g., for a smaller subset of devices than are receiving symbols.

Figure 2:
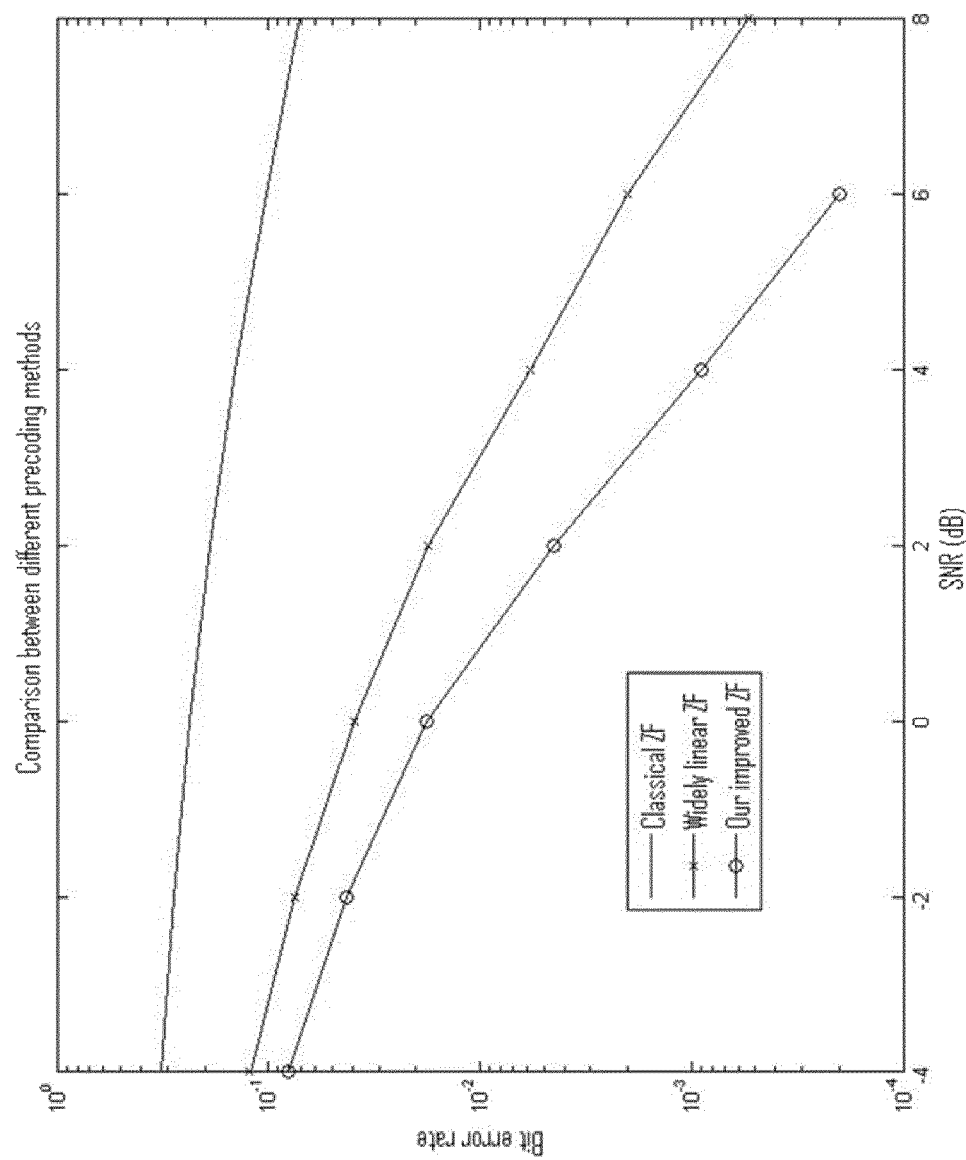
FIG. 2 shows BER results from an exemplary simulation.

FIG. 2 shows exemplary simulation results for a bit error rate (BER) for each device 200 with BPSK as the transmitted PAM alphabet. The simulation results of FIG. 2 assume that N=K=4, and that 50000 independent Rayleigh fading channels are generated when the AP 100 transmits four independent BPSK symbols across each channel realization. Thus, the simulation of FIG. 2, for example, represents the BER across one subcarrier of an Orthogonal Frequency Division Multiplex (OFDM) system. FIG. 2 shows the BER for a system that uses a classical ZF precoder, a system that uses only the real-valued ("widely linear") precoder (i.e., only the first K rows are inverted to generate the precoder), and a system that selectively uses the real-value or imaginary value for each device according to the solution presented herein. As shown in FIG. 2, the solution presented herein provides large gains, e.g., at least 2 dB, relative to the other two options. Further, given that the simulation considers only $2^4=16$ different precoders, the complexity associated with the system used to produce the simulated results is very low.

Further, the following analyzes the complexity of the solution presented herein more generally. As noted above, there are $2^K$ choices of rows from $H_r$, each generating a certain precoder. From the candidate set of $2^K$ precoders, the best one is chosen (e.g., the one with lowest energy). However, note that the wireless system is generally bound the requirement that K is less than or equal to N, which is a typical requirement in MU-MIMO, namely that the number of served devices 200 is not more than the number of antennas at the AP 100. In most APs, there are at most eight antennas (N=8), which results in a candidate set of 256 different precoders. Choosing the best one from a list of 256 candidate precoders is doable by any modern AP 100. Another possibility is to not consider all the $2^K$ possible precoders, but rather to consider only a (maybe randomly selected) subset, to reduce the complexity further. This option would still result in a gain, although not as large as when looking at the full candidate set. Yet another possibility is to, in a systematic and algorithmic way, select a subset of K rows from $H_r$ that will result in a precoder with lower energy than the classical ZF precoder $H^+$.

FIG. 3 shows a flow chart for an exemplary method 300 implemented by the AP 100 for each of a plurality (K) of wireless devices 200 expected to receive one-dimensional signals, where the AP 100 comprises N antennas and where N is greater than or equal to K. The method 300 comprises selecting which one of a real dimension and an imaginary dimension a modulated signal should be received on at the corresponding wireless device 200 (block 310). This selection is made independently for each wireless device 200. The method further comprises generating a signal modulating the symbols such that the signal received at each wireless device 200 configured to receive only one dimension is free (or substantially free) of inter-user interference on the dimension selected for the corresponding device (block 320), and transmitting the generated signal to the wireless devices 200 (block 330).

FIG. 4 shows a block diagram of the exemplary AP 100 configured to implement the method 300 of FIG. 3 for each wireless device 200 expected to receive one-dimensional signals. As shown in FIG. 4, AP 100 comprises N antennas 110 and one or more processing circuits 120. While not required, exemplary processing circuits 120 comprise a selection circuit 122, an optional indication circuit 124, a generation circuit 126, and a communication circuit 128. The processing circuit(s) 120, e.g., the selection circuit 122, are operative to select which one of a real dimension and an imaginary dimension a modulated symbol should be received on at the corresponding wireless device 200. The processing circuit(s) 120, e.g., the generation circuit 126, are operative to generate a signal modulating the symbols such that the signal received at each wireless device 200 configured to receive only one dimension is free (or substantially free) of inter-user interference on the selected dimension. The processing circuit(s) 120, e.g., the communication circuit 128, are operative to transmit the generated signal to the wireless devices 200. The processing circuit(s) 120, e.g., the optional indication circuit 124, may also indicate to the wireless device 200 the selected dimension. It will be appreciated that method 300 may be implemented on any one or more processing circuits, and that additional processing circuits not explicitly shown may be used.

Figure 5:
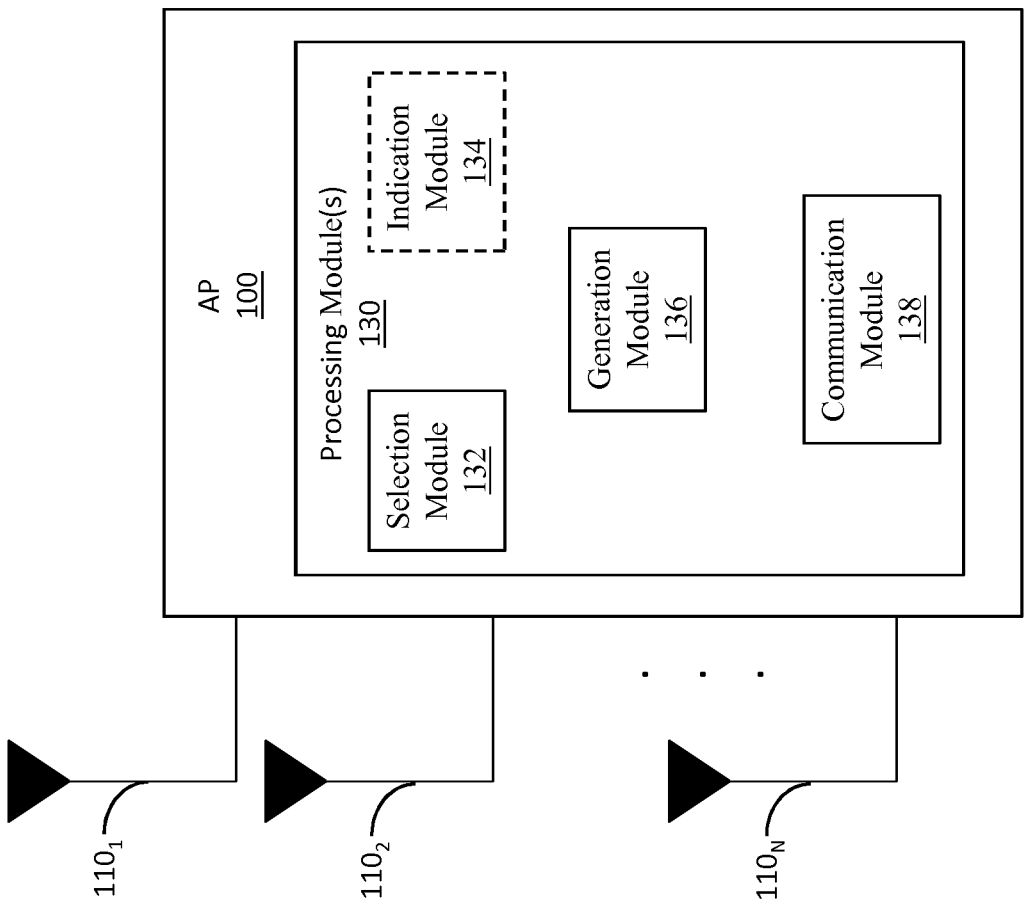
FIG. 5 shows a block diagram of another exemplary AP.

It will further be appreciated that other devices may implement the method 300 of FIG. 3. For example, AP 100 shown in FIG. 5 may use the processing module(s) 130, e.g., selection module 132, optional indication module 134, generation module 136, and communication module 138, to implement method 300, and any of the above described tasks and/or functions associated with the processing circuit(s) 120. Those of skill in the art will also readily recognize that the method 300 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 300 may be implemented using one or more processing circuits (in the AP 100) comprising software instructions that when run on the processing circuit(s) cause the processing circuit(s) to execute the method 300 of FIG. 3.

Figure 6:
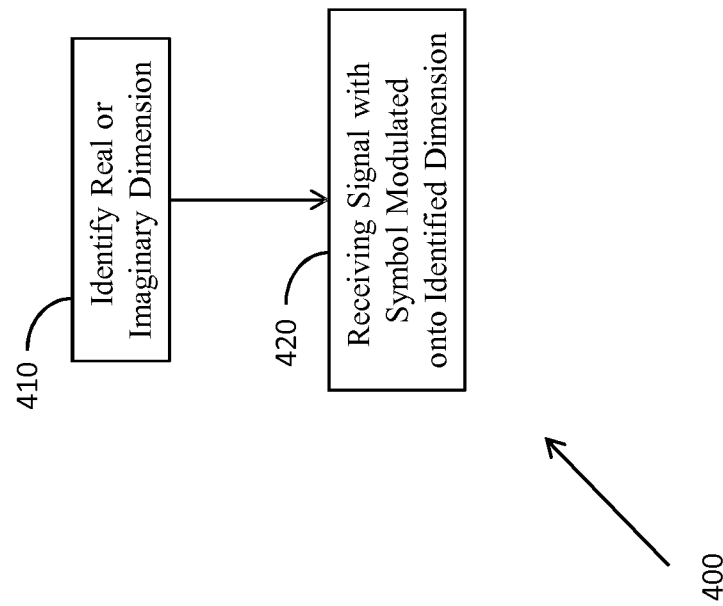
FIG. 6 shows an exemplary method implemented by each wireless device.

FIG. 6 shows a flow chart for an exemplary method 400 implemented by the wireless device 200 in communication with the AP 100, where the AP 100 comprises N antennas and where N is greater than or equal to K (the number of wireless devices 200). The method 400 comprises identifying either a real or imaginary dimension as comprising data for the wireless device (block 410). The method 400 further comprises receiving a signal in which a symbol is modulated onto the identified one of the real or imaginary dimension, but not both, such that the symbol modulated onto the identified dimension is free of inter-user interference (block 420).

Figure 7:
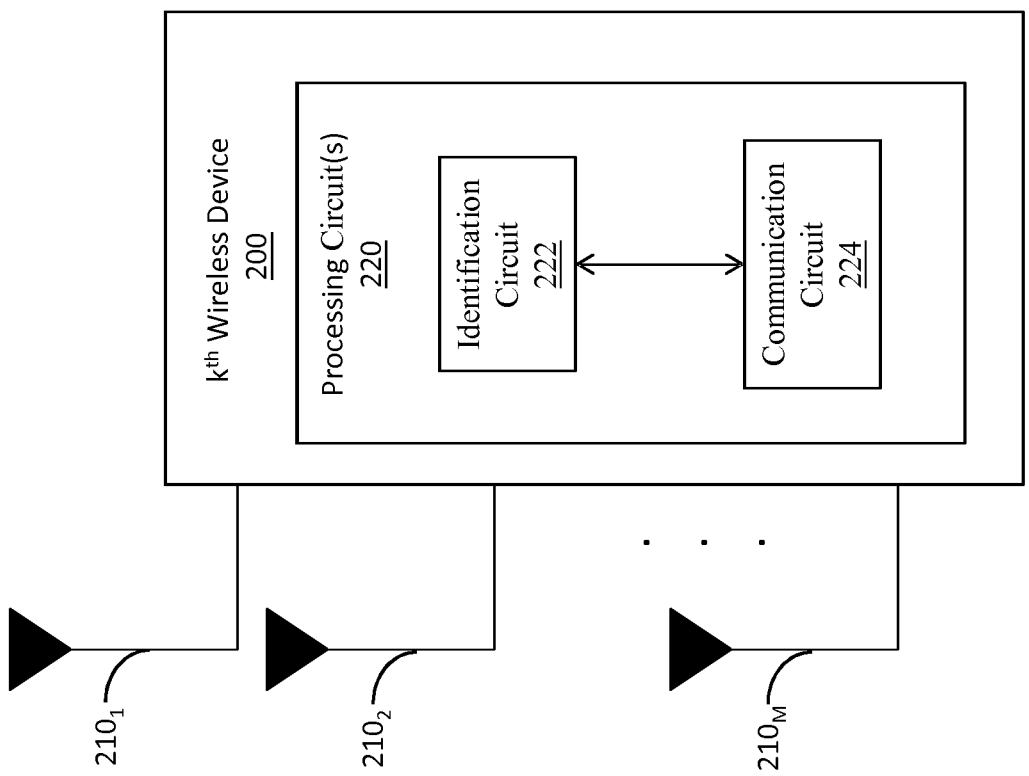
FIG. 7 shows a block diagram of an exemplary wireless device.

FIG. 7 shows a block diagram of the exemplary wireless device 200 configured to implement the method 400 of FIG. 6. As shown in FIG. 7, wireless device comprises one or more (M) antennas 210 and one or more processing circuits 220. While not required, exemplary processing circuits 220 comprise an identification circuit 222 and a communication circuit 224. The processing circuit(s) 220, e.g., the identification circuit 222, are operative to identify either a real or imaginary dimension as comprising data for the wireless device. The processing circuit(s) 220, e.g., the communication circuit 224, are operative to receive a signal in which a symbol is modulated onto the identified one of the real or imaginary dimension, but not both, such that the symbol modulated onto the identified dimension is free of inter-user interference. It will be appreciated that method 400 may be implemented on any one or more processing circuits, and that additional processing circuits not explicitly shown may be used.

Figure 8:
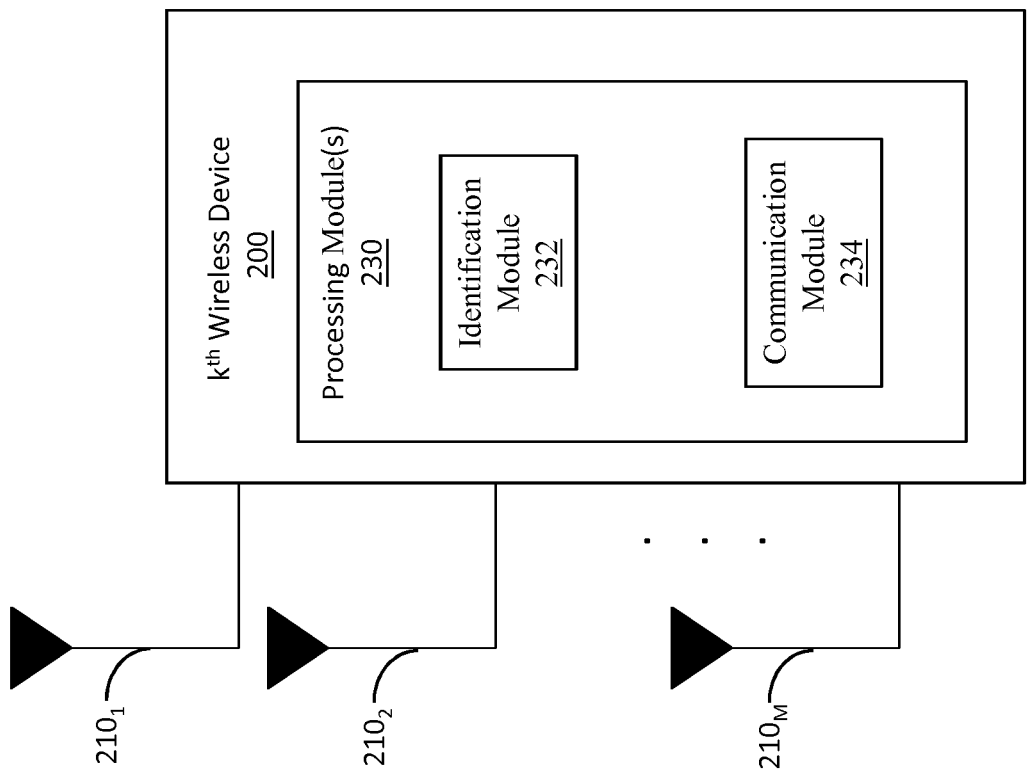
FIG. 8 shows a block diagram of another exemplary wireless device.

It will further be appreciated that other devices may implement the method 400 of FIG. 6. For example, the wireless device 200 shown in FIG. 8 may use the processing module(s) 230, e.g., identification module 232 and communication module 234, to implement method 400, and any of the above described tasks and/or functions associated with the processing circuit(s) 220. Those of skill in the art will also readily recognize that the method 400 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 400 may be implemented using one or more processing circuits (in the wireless device 200) comprising software instructions that when run on the processing circuit(s) cause the processing circuit(s) to execute the method 400 of FIG. 6.

The solution presented herein gives the AP 100 the freedom to put modulated symbols, e.g., PAM symbols, on either the real part or the imaginary part of a transmitted signal, which effectively results in the AP 100 transmitting possibly purely real PAM symbols on some data streams, purely imaginary symbols on other data streams, and/or complex-valued symbols on still other data streams. As such, the solution presented herein advantageously generates and uses a ZF precoder having a lower energy than the conventional ZF precoder $H^+$, where the conventional ZF precoder $H^+$ generally comprises the pseudo-inverse of the complete channel matrix of the channels between the N antennas of the AP and each wireless device. As such, the solution presented herein improves the overall performance and/or throughput of one-dimensional modulation systems, e.g., PAM systems.

While the solution presented herein is described in terms of ZF precoders, it will be appreciated that the solution presented herein applies to other types of precoders, e.g., minimum mean square error (MMSE) type precoders.

The solution presented above assumes the AP 100 transmits a signal to a plurality of wireless devices configured to receive symbols on only one dimension. However, the solution presented herein also applies to a plurality of wireless devices 200, where a first subset of the plurality of wireless devices 200 is configured to receive modulated symbols on only one dimension, while a second subset of the plurality of wireless devices 200 is configured to receive modulated symbols on both dimensions of a complex signal, where any of the wireless devices may comprise multiple receive antennas. To illustrate, consider the following example. This example is for illustrative purposes, and is not intended to be limiting.

For simplicity, assume the plurality of wireless devices 200 comprises three devices 200 with two antennas 210 each, where a first device 200 and a second device 200 are both configured to receive a multi-dimension symbol, e.g., a QAM symbol, and the third device 200 is configured to receive a one-dimensional symbol, e.g., a PAM symbol. Further assume the AP 100 has four antennas 110. Let $H_1$ be the (2×4) channel from the AP 100 to the first device 200, $H_2$ from the AP 100 to the second device 200, and $H_3$ from the AP 100 to the third device 200. The composite channel (6×4) from the AP 100 to the three devices may be represented by:

$$H = \begin{bmatrix} H_1 \\ H_2 \\ H_3 \end{bmatrix} \quad (11)$$

When this channel matrix is expanded into the real-valued domain, we get the (12×8) channel:

$$H_r = \begin{bmatrix} \text{Re}\{H\} & \text{Im}\{H\} \\ -\text{Im}\{H\} & \text{Re}\{H\} \end{bmatrix} \quad (12)$$

Now, rows 1-4 of $H_r$ correspond to the real part of the two antennas 210 of the first and second devices 200, while rows 5-6 correspond to the real part of the two antennas 210 of the third device 200. Rows 7-10 correspond to the imaginary part of the two antennas 210 of the first and second devices 200, while rows 11-12 correspond to the imaginary part of the two antennas 210 of the third device 200.

First consider the first device 200. Because the first device 200 is configured to receive a symbol on both dimensions, e.g., QAM symbol, composed of a real part and an imaginary part, the AP 100 may place these two parts on any two of rows 1-2 and rows 7-8 (since these are the real and imaginary parts of the two antennas 210 at the first device 200, respectively). Similarly, for the second device 200, the AP 100 chooses any two of rows 3-4 and rows 9-10. Finally, for the third device 200, which should only receive a symbol on only one dimension, the AP 100 chooses any one of the rows 5-6 and rows 11-12.

Equivalently, in the complex-valued domain, this amounts to the AP 100 choosing a beam for the first device 200 that carries the single QAM symbol, such that the real part of the transmitted QAM symbol arrives on either the real or imaginary part of the first or second antenna 210 of the first device 200, and similarly such that the imaginary part of the QAM symbol arrives on the other of the real or imaginary part of the first or second antenna 210 (where the two parts are not overlapping, e.g., received on the same antenna and dimension). The same reasoning holds for the second and third devices 200. Moreover, because these beams constitute the ZF precoder, they are orthogonal to the channels of the other devices 200. Thus, the solution presented herein not only enables the dimension to be selected, but also enables the additional choice of choosing among receiving antennas 210 for each device 200. As a result, the solution presented herein provides more choices of channels, and thus enables a better precoder to be achieved than when having only a single antenna at each receiving device.

The solution presented herein may further be extended to the case where a device 200 can receive more than one symbol (one dimensional or two dimensional). As long as there are more dimensions at each device 200 (the number of dimensions is 2*(number of receive antennas 210), where the "2" comes from the real and imaginary dimensions of each antenna 210) than the number of signaling dimensions transmitted to the device 200 (e.g., a single QAM symbol has two signaling dimensions, so transmitting two QAM symbols to a device 200 corresponds to four signaling dimensions transmitted to the device 200), the solution presented herein may be applied.

Figure 9:
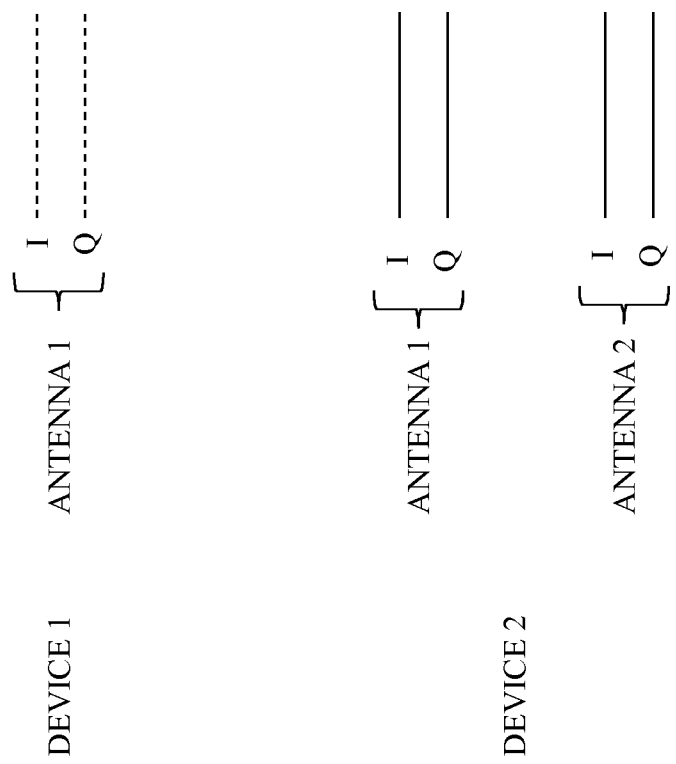
FIG. 9 shows an example of antenna and dimension distribution at the devices.

The following provides another non-limiting example. Assume the AP 100 transmits signals to two wireless devices 200, where the first device 200 has one antenna 210 and the second device 200 two antennas 210. The first device 200 will receive a PAM symbol (a one dimensional constellation), while the second device 200 will receive one QAM symbol (a two dimensional constellation) and one PAM symbol (a one dimensional constellation). Each antenna 210 at a wireless device 200 will receive a signal that in general occupies both the real dimension and the complex dimension. See FIG. 9, which depicts the fact that the first device 200 has two dimensions to receive across, while the second device 200 has four dimensions to receive across (two antennas 210, each receiving a real and imaginary dimension of the signal).

Figure 10:
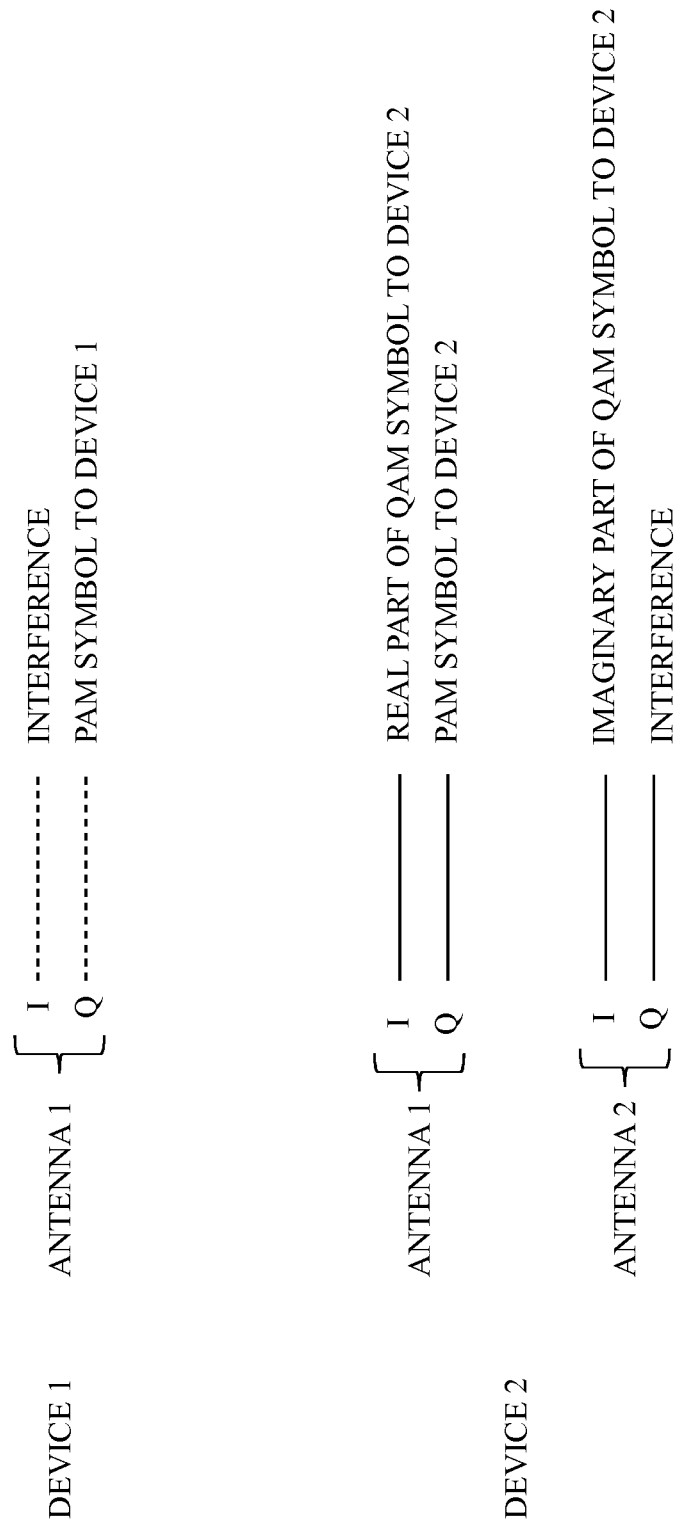
FIG. 10 shows an example of symbol distribution across the antenna dimensions at the devices.

Because the first device 200 will receive a one dimensional signal, e.g., a PAM symbol, the AP 100 has the choice to construct a transmit signal such that the PAM symbol to the first device 200 will be received interference free on either the I or Q part of the first device's single antenna 210. Similarly, the signal transmitted from the AP 100 will contain the QAM symbol and the PAM symbol to the second device 200, where the AP 100 has the choice to place the two dimensions of the QAM symbol onto any two dimensions (of a total of four) at the second device 200, and the PAM symbol onto one of the other two available dimensions. Hence, as an example, the AP might choose to construct a signal such that the QAM symbol is received on first antenna's I part and second antenna's I part, while the PAM symbol is received on first antenna's Q part, as shown in FIG. 10. FIG. 10 also shows how the AP 100 may place the PAM symbol to the first device 200 on its antenna's imaginary part.

It will be appreciated that this example may be generalized to more devices 200 and more antennas 210. As long as a device 200 is receiving symbols that in total span fewer dimensions than the device 200 can receive in total (which is 2*(number of receiving antennas)), then the AP 100 has a choice on which dimensions and antennas 210 it will place the symbol dimensions. It will further be appreciated that the dimension selection of the solution presented herein is independent, meaning the dimension selection for one antenna 210 of one device 200 does not rely on the dimension selection for any other antenna 210 of that device 200 or on any other antenna 210 of any other device 200.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended embodiments are intended to be embraced therein.

The invention claimed is:

1. A method of transmitting modulated complex signals from an Access Point (AP) having a plurality of antennas to a plurality of wireless devices, the plurality of wireless devices including at least a first plurality of wireless devices configured to receive only one dimension of a modulated complex signal, the method comprising:
   selecting, independently for each of the first plurality of wireless devices, which one of a real dimension and an imaginary dimension a modulated symbol should be received on at each of the first plurality of wireless devices;
   generating a signal modulating the symbols for each of the devices of at least the first plurality of wireless devices such that signals received at each wireless device in the first plurality of wireless devices are substantially free of inter-user interference on the selected dimension for each of the first plurality of wireless devices; and
   transmitting the generated signal at least to the first plurality of wireless devices.

2. The method of claim 1 further comprising indicating the selected dimension to at least one of the wireless devices in the first plurality of wireless devices.

3. The method of claim 1 wherein generating the signal comprises:
   generating a precoder for each combination of channel models for each combination of channels between the AP and each of the plurality of wireless devices;
   selecting the precoder having the lowest energy; and
   generating the signal modulating the symbols for each of the devices of at least the first plurality of wireless devices by applying the selected precoder to the symbols for each of the devices of at least the first plurality of wireless devices.

4. The method of claim 3 wherein generating the precoders comprises:
   generating a complex channel model from each antenna at the AP to each antenna of each wireless device in the plurality of wireless devices;
   grouping the complex channel models from all AP antennas to all wireless devices in the plurality of wireless devices;
   expressing the complex channel models as real- and imaginary-valued representations;
   selecting and generating a precoder for all permutations of the real- and imaginary-valued representations of the complex channel models subject to the constraint that each of the wireless devices in the first plurality of wireless devices receives the corresponding modulated symbol on the real or imaginary dimension, but not both; and
   generating the precoder for each permutation.

5. The method of claim 1 wherein generating the signal comprises:
   generating a precoder for each combination of channel models for each combination of channels between the AP and each of the plurality of wireless devices;
   selecting a subset of the precoders corresponding to all combinations;
   selecting, from the subset of precoders, a precoder having the lowest energy; and
   generating the signal modulating the symbols for each of the devices of at least the first plurality of wireless devices by applying the selected precoder to the symbols for each of the devices of at least the first plurality of wireless devices.

6. The method of claim 5 wherein generating the precoders comprises:
   generating a complex channel model from each antenna at the AP to each antenna of each wireless device in the plurality of wireless devices;
   grouping the complex channel models from all AP antennas to all wireless devices in the plurality of wireless devices;
   expressing the complex channel models as real- and imaginary-valued representations;
   selecting and generating a precoder for all permutations of the real- and imaginary-valued representations of the complex channel models subject to the constraint that each of the wireless devices in the first plurality of wireless devices receives the corresponding modulated symbol on a real or imaginary dimension, but not both; and
   generating the precoder for each permutation.

7. The method of claim 1 wherein the plurality of wireless devices further comprises a second plurality of wireless devices different from the first plurality of wireless devices, each of said second plurality of wireless devices configured to receive a modulated symbol on both dimensions of a complex signal.

8. The method of claim 7:
further comprising selecting, independently for each of the second plurality of wireless devices, which real dimension and which imaginary dimension a modulated symbol should be received on at the corresponding wireless device;
wherein generating the signal comprises generating the signal modulating the symbols for the plurality of wireless devices such that:
the signal received at each of the first plurality of wireless devices is substantially free of inter-user interference on the dimension selected for the corresponding wireless device;
each of the second plurality of wireless devices receives the corresponding modulated symbol on the selected real and imaginary dimensions; and
the signal received at each of the second plurality of wireless devices is substantially free of inter-user interference on the real and imaginary dimensions selected for each of the second plurality of wireless devices.

9. The method of claim 7 wherein each signal received by the wireless devices in the first plurality of wireless devices comprises a Pulse Amplitude Modulated complex signal, and wherein each signal received by the wireless devices in the second plurality of wireless devices comprises a Quadrature Amplitude Modulated complex signal.

10. The method of claim 1 wherein one or more of the first plurality of wireless devices comprises two or more reception antennas:
wherein selecting the dimension comprises selecting, independently for each of the first plurality of wireless devices comprising two or more reception antennas, which one of a real and an imaginary dimension of a first one of the two or more reception antennas a modulated first symbol should be received on and which one of a real and an imaginary dimension of a second one of the two or more reception antennas, different from the first one of the two or more reception antennas, a modulated second symbol should be received on; and
wherein generating the signal comprises generating the signal modulating the first and second symbols for each of the devices of at least the first plurality of wireless devices comprising two or more reception antennas such that the signals received at each of the first plurality of wireless devices comprising two or more reception antennas are substantially free of inter-user interference on the dimension selected for each of the two or more reception antennas for each of the first plurality of wireless devices.

11. An Access Point (AP) operative to transmit modulated complex signals to a plurality of wireless devices, the plurality of wireless devices including at least a first plurality of wireless devices configured to receive only one dimension of a modulated complex signal, the AP comprising:
a plurality of antennas; and
one or more processing circuits operatively controlling the antennas, and operative to:
select, independently for each of the first plurality of wireless devices, which one of a real dimension and an imaginary dimension a modulated symbol should be received on at each of the first plurality of wireless devices;
generate a signal modulating the symbols for each of the devices of at least the first plurality of wireless devices such that signals received at each wireless device in the first plurality of wireless devices are substantially free of inter-user interference on the selected dimension for each of the first plurality of wireless devices; and
transmit the generated signal to at least to the first plurality of wireless devices.

12. A method of receiving, at a wireless device configured to receive a modulated complex signal from an Access Point (AP) having a plurality of antennas and transmitting to a plurality of wireless devices, the method comprising:
identifying either a real dimension or an imaginary dimension as comprising data for the wireless device; and
receiving a signal in which a symbol is modulated onto the identified one of the real dimension or the imaginary dimension, but not both, such that the symbol modulated onto the identified dimension is free of inter-user interference.

13. The method of claim 12 wherein identifying the real or imaginary dimension comprises receiving, from the AP, an indication of the real or the imaginary dimension.

14. The method of claim 12 wherein the wireless device comprises two or more receive antennas, and wherein receiving the signal comprises receiving, at a selected first receive antenna, the signal in which the symbol is modulated onto the identified one or the real dimension or the imaginary dimension.

15. The method of claim 14 further comprising receiving, at a selected second receive antenna different from the first receive antenna, a second signal in which a second symbol is modulated onto an identified one of the real or imaginary dimension, but not both, such that the second symbol modulated onto the identified dimension is free of inter-user interference.

16. A wireless device operative to receive a modulated complex signal from an Access Point (AP) transmitting to a plurality of wireless devices, the wireless device comprising:
one or more antennas; and
one or more processing circuits operatively controlling the one or more antennas, and operative to:
identify either a real dimension or an imaginary dimension as comprising data for the wireless device; and
receive a signal in which a symbol is modulated onto the identified one of the real dimension or the imaginary dimension, but not both, such that the symbol modulated onto the identified dimension is free of inter-user interference.

17. The wireless device of claim 16 wherein the one or more processing circuits identify the real or imaginary dimension by receiving, from the AP, an indication of either the real or imaginary dimension.

18. The wireless device of claim 16 wherein the wireless device comprises two or more receive antennas, and wherein the one or more processing circuits receive the signal by receiving, at a selected first receive antenna, the signal in which the symbol is modulated onto the identified one or the real dimension or the imaginary dimension.

19. The wireless device of claim 18 wherein the one or more processing circuits are further configured to receive, at a selected second receive antenna different from the first receive antenna, a second signal in which a second symbol is modulated onto an identified one of the real or imaginary dimension, but not both, such that the second symbol modulated onto the identified dimension is free of inter-user interference.

* * * * *